US011615267B2

(12) United States Patent
Ghesu et al.

(10) Patent No.: US 11,615,267 B2
(45) Date of Patent: Mar. 28, 2023

(54) X-RAY IMAGE SYNTHESIS FROM CT IMAGES FOR TRAINING NODULE DETECTION SYSTEMS

(71) Applicant: Siemens Healthcare GmbH, Erlangen (DE)

(72) Inventors: Florin-Cristian Ghesu, Princeton, NJ (US); Siqi Liu, Princeton, NJ (US); Arnaud Arindra Adiyoso, Nuremberg (DE); Sasa Grbic, Plainsboro, NJ (US); Marvin Teichmann, Cambridge (GB)

(73) Assignee: Siemens Healthcare GmbH, Erlagen (DE)

( * ) Notice: Subject to any disclaimer, the term of this patent is extended or adjusted under 35 U.S.C. 154(b) by 5 days.

(21) Appl. No.: 15/929,427

(22) Filed: May 1, 2020

(65) Prior Publication Data

US 2021/0342638 A1    Nov. 4, 2021

(51) Int. Cl.
*G06T 7/00*         (2017.01)
*G06K 9/62*         (2022.01)
(Continued)

(52) U.S. Cl.
CPC ......... *G06K 9/6256* (2013.01); *G06K 9/6288* (2013.01); *G06N 20/00* (2019.01);
(Continued)

(58) Field of Classification Search
CPC ....... G06T 7/00; G06T 7/0012; G06T 7/0014; G06T 2207/10081; G06T 2207/10116;
(Continued)

(56) References Cited

U.S. PATENT DOCUMENTS

| 8,121,373 | B2 * | 2/2012 | Matsumoto | ........... | G06T 7/0012 |
| | | | | | 382/131 |
| 2004/0151358 | A1 * | 8/2004 | Yanagita | ................ | G16H 30/40 |
| | | | | | 382/132 |

(Continued)

FOREIGN PATENT DOCUMENTS

EP          2710958 A2 *   3/2014   ............... A61B 6/50

OTHER PUBLICATIONS

"Moturu e al., Creation of Synthetic X-Rays to Train a Neural Network to Detect Lung Cancer, Aug. 20, 2018, Department of Computer Science, University of Toronto, 2018, pp. 1-16" (Year: 2018).*

(Continued)

*Primary Examiner* — Claire X Wang
*Assistant Examiner* — Denise G Alfonso

(57) ABSTRACT

Systems and methods for generating synthesized medical images for training a machine learning based network. An input medical image in a first modality is received comprising a nodule region for each of one or more nodules, a remaining region and an annotation for each of the nodules. A synthesized medical image in a second modality is generated from the input medical image comprising the annotation for each of the nodules. A synthesized nodule image of each of the nodule regions and synthesized remaining image of the remaining region are generated in the second modality. It is determined whether a particular nodule is visible in the synthesized medical image based on the synthesized nodule image for the particular nodule and the synthesized remaining image. If at least one nodule is not visible in the synthesized medical image, the annotation for the not visible nodule is removed from the synthesized nodule image.

14 Claims, 7 Drawing Sheets

(51) Int. Cl.
    *G06N 20/00*     (2019.01)
    *G06T 3/60*     (2006.01)
    *G06T 5/50*     (2006.01)

(52) U.S. Cl.
    CPC ............... *G06T 3/60* (2013.01); *G06T 5/50* (2013.01); *G06T 7/0012* (2013.01); *G06T 2207/10081* (2013.01); *G06T 2207/10116* (2013.01); *G06T 2207/20081* (2013.01); *G06T 2207/30064* (2013.01); *G06T 2207/30168* (2013.01); *G06V 2201/032* (2022.01)

(58) Field of Classification Search
    CPC . G06T 2207/20081; G06T 2207/30064; G06T 2207/30168; G06T 3/00; G06T 3/60; G06T 5/50; G06T 2207/10072; G06T 11/003; G06K 2209/00; G06K 2209/053; G06K 9/6256; G06K 9/6288; G06N 20/00; G06V 2201/032
    See application file for complete search history.

(56) References Cited

U.S. PATENT DOCUMENTS

2019/0259153 A1     8/2019    Zhang et al.
2021/0192735 A1*   6/2021    Wang .................... G06T 7/0012

OTHER PUBLICATIONS

B. Yu, L. Zhou, L. Wang, Y. Shi, J. Fripp and P. Bourgeat, "Ea-GANs: Edge-Aware Generative Adversarial Networks for Cross-Modality MR Image Synthesis," in IEEE Transactions on Medical Imaging, vol. 38, No. 7, pp. 1750-1762, Jul. 2019, doi: 10.1109/TMI.2019.2895894. (Year: 2019).*
H. Lin, T. Liu and J. Chuang, "Learning a Scene Background Model via Classification," in IEEE Transactions on Signal Processing, vol. 57, No. 5, pp. 1641-1654, May 2009, doi: 10.1109/TSP.2009.2014810. (Year: 2009).*
Menze, Bjoern H., et al. "The multimodal brain tumor image segmentation benchmark (BRATS)." IEEE transactions on medical imaging 34.10 (2014): 1993-2024. (Year: 2014).*
Berlin, "Malpractice Issues in Radiology: Comparing New Radiographs with Those Obtained Previously", AJR American Journal of Roentgenology, 1999, vol. 172, pp. 3-6.
Del Ciello et al., "Missed Lung Cancer: When, Where, and Why?", Diagnostic and Interventional Radiology, Turkish Society of Radiology, 2017, vol. 23, No. 2, pp. 118-126.
Wang et al., "ChestX-Ray8: Hospital-scale Chest X-ray Database and Benchmarks on Weakly-Supervised Classification and Localization of Common Thorax Diseases", The IEEE Conference on Computer Vision and Pattern Recognition (CVPR), 2017, 20 pgs.
Gündel et al., "Learning to Recognize Abnormalities in Chest X-Rays with Location-Aware Dense Networks", CIARP 2018: Progress in Pattern Recognition, Image Analysis, Computer Vision, and Applications, 9 pgs.
Chattopadhay et al., "Grad-CAM++: Generalized Gradient-based Visual Explanations for Deep Convolutional Networks", The IEEE Winter Conference on Applications of Computer Vision (WACV), arXiv:1710.11063v1, Oct. 30, 2017, 14 pgs.
Li et al., "A Solitary Feature-Based Lung Nodule Detection Approach for Chest X-Ray Radiographs", IEEE Journal of Biomedical and Health Informatics, 2016, vol. 22, No. 2, 9 pgs.
Arjovsky et al., "Wasserstein GAN", arXiv preprint arXiv:1701.07875v3, Dec. 6, 2017, 32 pgs.
Girshick, "Fast R-CNN", The IEEE International Conference on Computer Vision (ICCV), 2015, pp. 1440-1448.
Ronneberger et al., "U-Net: Convolutional Networks for Biomedical Image Segmentation", International Conference on Medical Image Computing and Computer-Assisted Intervention, Springer, 2015, 8 pgs.
Moturu et al., "Creation of Synthetic X-Rays to Train a Neural Network to Detect Lung Cancer", Department of Computer Science, University of Toronto, 2018, pp. 1-16.
U.S. Appl. No. 16/570,214, filed Sep. 13, 2019, 45 pgs.
U.S. Appl. No. 16/445,435, filed Jun. 19, 2019, 33 pgs.
Extended European Search Report (EESR) dated Oct. 7, 2021 in corresponding European patent application No. 21171503.2.
Zhang Yue et al: "Unsupervised X-ray image segmentation with task driven generative adversarial networks"; Medical Image Analysis; vol. 62; May 1, 2020; p. 101664.
Chang, Alex et al: "Detecting Early Stage Lung Cancer using a Neural Network Trained with Patches from Synthetically Generated X-Rays"; Jan. 4, 2019.

* cited by examiner

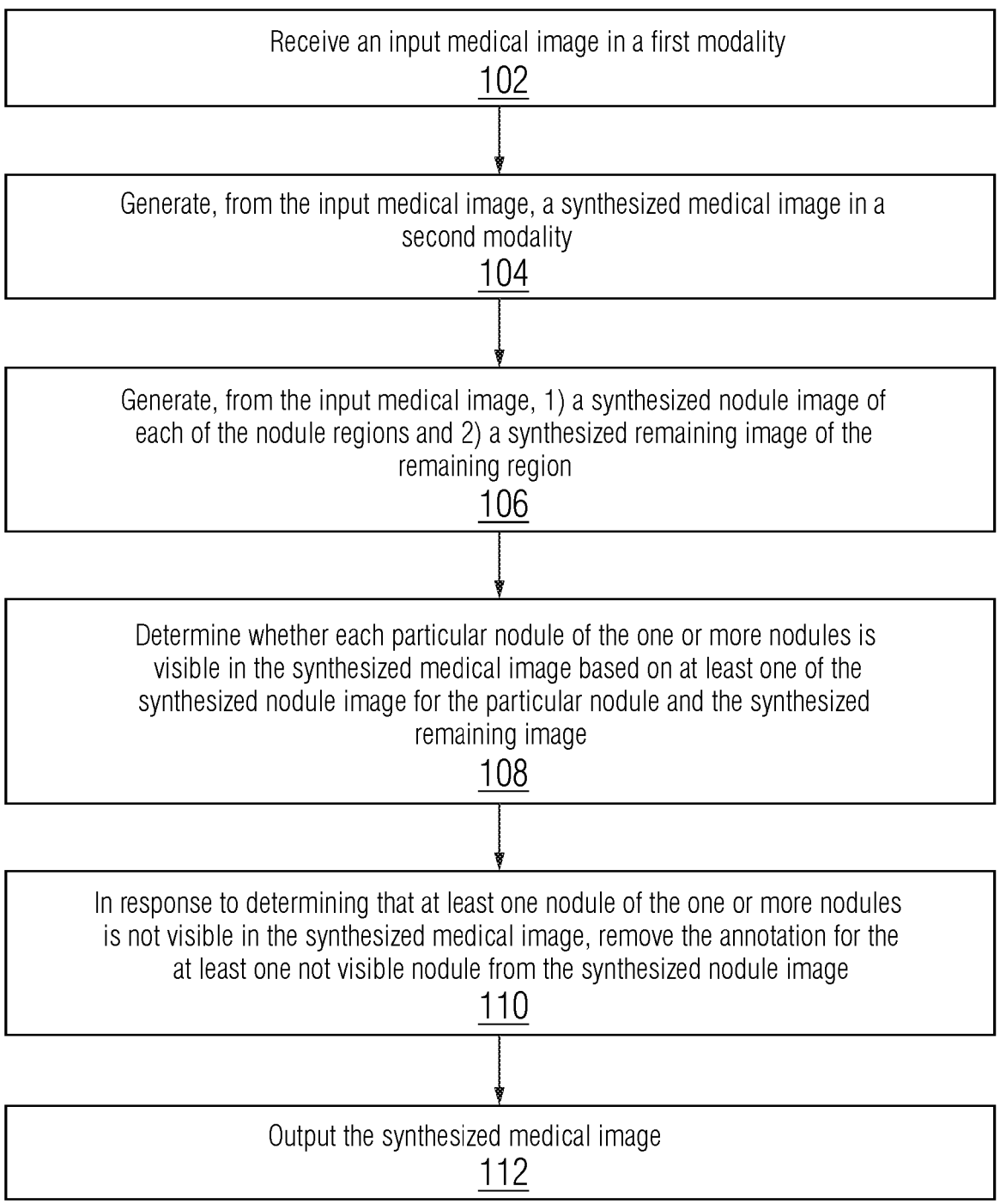

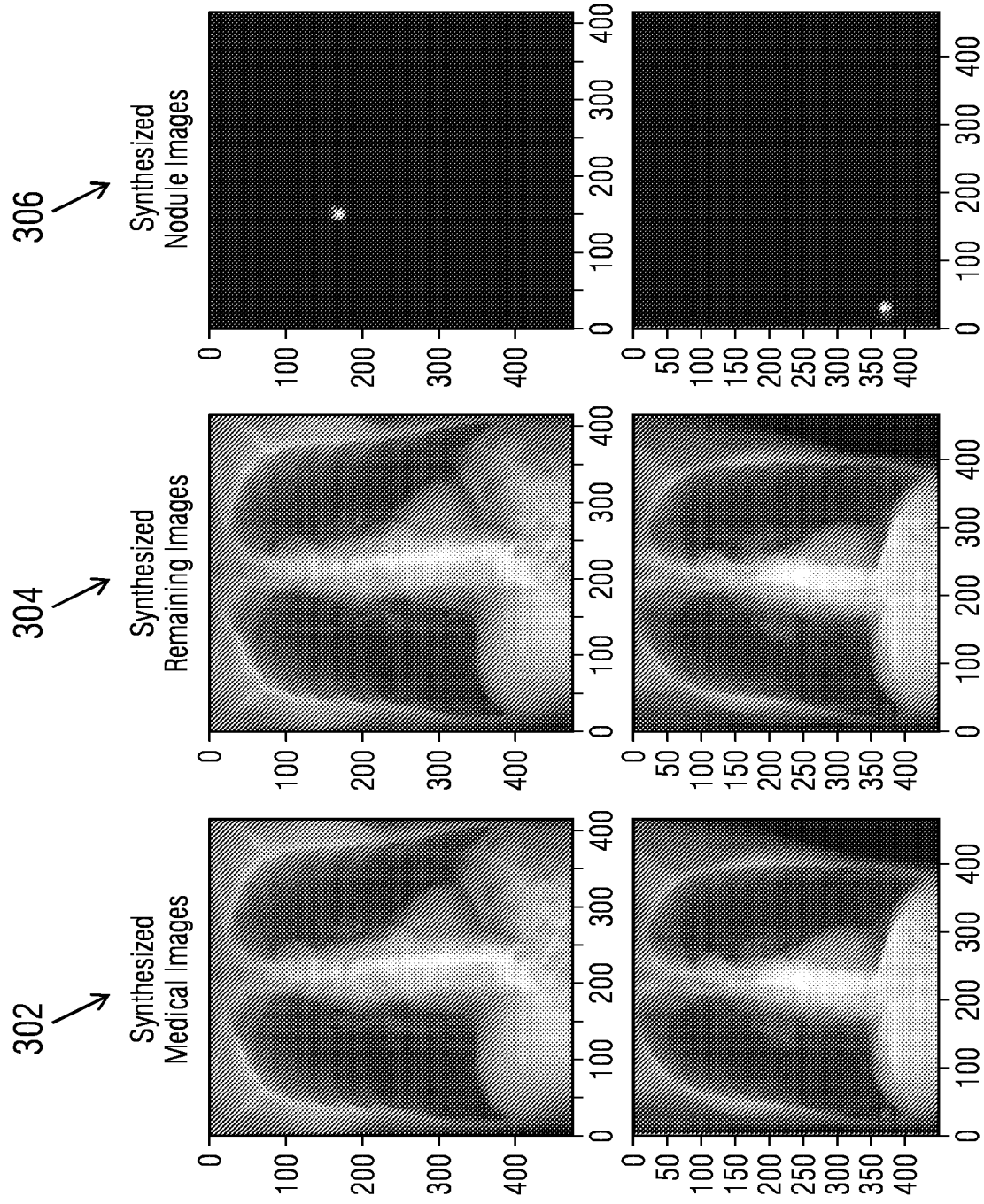

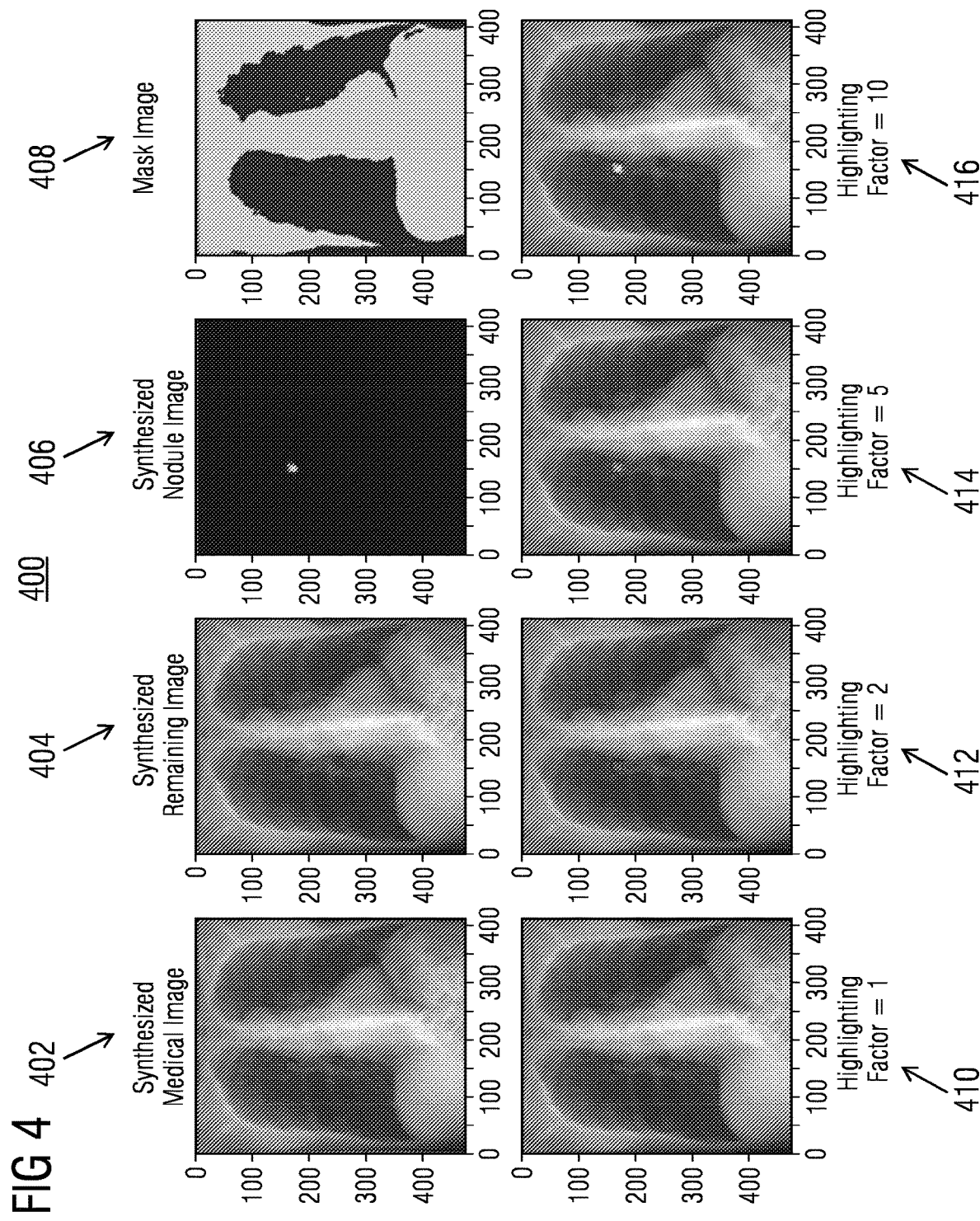

X-RAY IMAGE SYNTHESIS FROM CT IMAGES FOR TRAINING NODULE DETECTION SYSTEMS

TECHNICAL FIELD

The present invention relates generally to x-ray image synthesis from CT (computed tomography) images, and in particular to x-ray image synthesis from CT images for training nodule detection systems and other machine learning based systems.

BACKGROUND

The early detection of lung disease is critical for successful treatment. One important task for the early detection of lung disease is pulmonary nodule detection in chest x-ray images. In the current clinical practice, pulmonary nodule detection is performed manually by a radiologist reading x-ray images. However, the ambiguity of the x-ray images caused by the 2D projection of x-ray beams results in a high number of missed nodules. In addition, with the increasing number of x-ray acquisitions and the general shortage of radiologists, the amount of time allotted for radiologists to read x-ray images is limited, further contributing to the high number of missed nodules.

Recently, machine learning based nodule detection systems have been proposed for automatically detecting pulmonary nodules in chest x-ray images. Such machine learning based nodule detection systems are trained using large scale chest x-ray datasets with annotated nodule locations. However, the ambiguity of x-ray images also makes the task of annotating the nodules in large scale datasets of x-ray images challenging. Further, to ensure accurate annotations, consensus results obtained from experienced radiologists is required, significantly increasing the time and cost required to obtain such datasets.

BRIEF SUMMARY OF THE INVENTION

In accordance with one or more embodiments, systems and methods for generating synthesized medical images for training a machine learning based network are provided. An input medical image in a first modality is received. The input medical image comprises a nodule region for each of one or more nodules and a remaining region. The input medical image comprises an annotation for each of the one or more nodules. A synthesized medical image in a second modality is generated from the input medical image. The synthesized medical image comprises the annotation for each of the one or more nodules. A synthesized nodule image of each of the nodule regions and synthesized remaining image of the remaining region are generated in the second modality. It is determined whether each particular nodule of the one or more nodules is visible in the synthesized medical image based on at least one of the synthesized nodule image for the particular nodule and the synthesized remaining image. In response to determining that at least one nodule of the one or more nodules is not visible in the synthesized medical image, the annotation for the at least one not visible nodule is removed from the synthesized nodule image.

In one embodiment, it is determined whether each of the one or more nodules is visible in the synthesized medical image by comparing an intensity of pixels in the synthesized remaining image to a threshold. In one embodiment, it is determined whether each of the one or more nodules is visible in the synthesized medical image by determining a change between an intensity at a center of the particular nodule in the synthesized remaining image and an intensity at the center of the particular nodule in the synthesized nodule image and comparing the intensity change to a threshold. In one embodiment, it is determined whether each of the one or more nodules is visible in the synthesized medical image by determining a change between an average intensity of pixels within half of a radius of the particular nodule in the synthesized remaining image and an average intensity of pixels within half of the radius of the particular nodule in the synthesized nodule image and comparing the change to a threshold.

In one embodiment, the synthesized medical image may be generated by increasing an intensity of pixels in the synthesized nodule images by a highlighting factor. In one embodiment, the synthesized medical image may be generated by positioning a previously acquired synthesized nodule image in the synthesized medical image. In one embodiment, the synthesized medical image may be generated by rotating the input medical image and generating the synthesized medical image from the rotated input medical image.

In one embodiment, a machine learning based network may be trained based on the synthesized medical image.

In one embodiment, the first modality is computed tomography and the second modality is x-ray.

These and other advantages of the invention will be apparent to those of ordinary skill in the art by reference to the following detailed description and the accompanying drawings.

BRIEF DESCRIPTION OF THE DRAWINGS

FIG. 1 shows a method for generating synthesized medical images for training a machine learning based system, in accordance with one or more embodiments;

FIG. 3 shows exemplary synthesized images, in accordance with one or more embodiments;

FIG. 4 shows a comparison of nodules highlighted with different highlighting factors, in accordance with one or more embodiments;

DETAILED DESCRIPTION

Figure 2A:
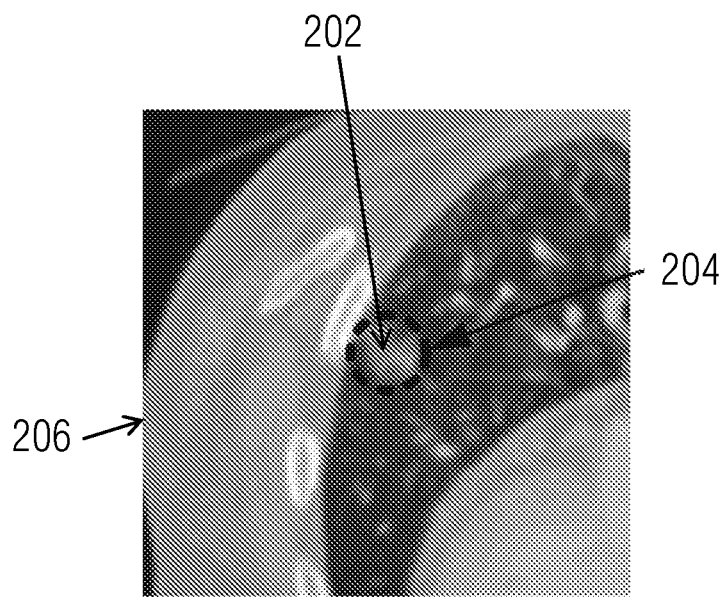
FIG. 2A shows an exemplary computed tomography medical image, in accordance with one or more embodiments.

The present invention generally relates to methods and systems for x-ray image synthesis from CT images for training nodule detection systems. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for the generation of synthesized x-ray images suitable for training machine learning based systems for performing various medical image analysis tasks, such as, e.g., nodule detection or lung segmentation. Such synthesized x-ray images are generated from CT (computed tomography) images, which are easier to annotate with nodule locations as compared to x-ray images due to the additional 3D context provided by the CT images. Thus, existing large scale CT datasets with high quality annotations are readily available. However, at times, nodules visible in CT images are not visible in the synthesized x-ray images, and thus not suitable for utilization in training machine learning based systems. Embodiments described herein provide for the automatic detection of nodules that are visible in the CT images but not visible in the synthesized x-ray images. Accordingly, machine learning based networks may be trained using the synthesized x-ray images where the nodules are visible, without using the synthesized x-ray images where the nodules are not visible.

FIG. 1 shows a method 100 for generating synthesized medical images for training a machine learning based system, in accordance with one or more embodiments. The steps of method 100 may be performed by one or more suitable computing devices, such as, e.g., computer 702 of FIG. 7. The synthesized medical images generated according to method 100 may be applied to train a machine learning based network for performing a medical imaging analysis task, such as, e.g., pulmonary nodule detection or lung segmentation. In one embodiment, the steps of method 100 may be repeatedly performed for each input medical image in a dataset of medical images (e.g., a training dataset).

At step 102, an input medical image in a first modality is received. The input medical image may be an image of a chest of a patient showing one or more pulmonary nodules. The input medical image includes annotations identifying the location of the one or more nodules. In one embodiment, the first modality is CT. However, the first modality may be any other suitable modality, such as, e.g., MRI (magnetic resonance imaging), ultrasound, x-ray, or any other medical imaging modality or combinations of medical imaging modalities. The input medical image may be a 2D (two dimensional) image or a 3D (three dimensional) volume. The input medical image may be received directly from an image acquisition device, such as, e.g., a CT scanner, as the medical image is acquired, or can be received by loading a previously acquired medical image from a storage or memory of a computer system or receiving a medical image that has been transmitted from a remote computer system.

The input medical image comprises a nodule region for each of the one or more nodules and a remaining region. Each nodule region depicts a respective one of the one or more nodules. The remaining region depicts the remaining portions of the input medical image that are outside of the nodules regions. The nodule regions and the remaining region may be defined based on the annotations.

FIG. 2A shows an exemplary CT medical image 200, in accordance with one or more embodiments. CT medical image 200 may be the input medical image received at step 102 of FIG. 1. CT medical image 200 comprises nodule region 204 depicting nodule 202. CT medical image 200 also comprises remaining region 206 depicting remaining portions of CT medical image 200 outside of nodule region 204.

At step 104, a synthesized medical image in a second modality is generated from the input medical image. In one embodiment, the second modality is x-ray. However, the second modality may be any other suitable modality, such as, e.g., CT, MRI, ultrasound, or any other medical imaging modality or combinations of medical imaging modalities. The synthesized medical image is a translation of the input medical image from the first modality to the second modality. Accordingly, the synthesized medical image also includes the annotation from the input medical image, as well as nodule regions and a remaining region corresponding to those in the input medical image.

Figure 2B:
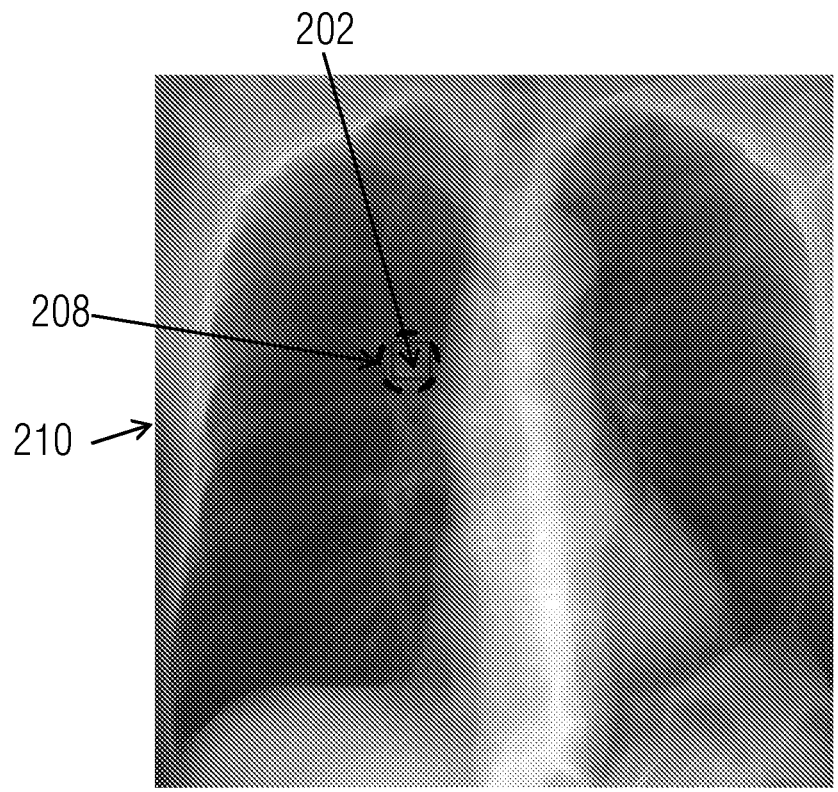
FIG. 2B shows an exemplary synthesized x-ray medical image, in accordance with one or more embodiments.

FIG. 2B shows an exemplary synthesized x-ray medical image 210, in accordance with one or more embodiments. Synthesized x-ray medical image 210 may be the synthesized medical image generated at step 104 of FIG. 1. Synthesized x-ray medical image 210 comprises nodule region 208 depicting nodule 202. Synthesized x-ray medical image 210 also comprises remaining region 212 depicting remaining portions of synthesized x-ray medical image 210 outside of nodule region 208. The locations of nodule region 208 and remaining region 212 in synthesized x-ray medical image 210 respectively correspond to the locations of nodule region 202 and remaining region 206 in CT medical image 200 of FIG. 2A such that the relative location of nodule region 208 and remaining region 212 in synthesized x-ray medical image 210 is the same as the relative location of nodule region 202 and remaining region 206 in CT medical image 200.

Referring back to FIG. 1, the synthesized medical image may be generated using any suitable technique. In one embodiment, a synthesized x-ray medical image is generated from an input CT medical image by projecting the input CT medical image using Beer's law to approximate the physical x-ray travelling through tissue. First, the radiodensity of the input CT medical image (in Hounsfield Units, HU) is transformed to attenuation (cm$^{-1}$) in order to meaningfully apply Beer's law. Accordingly, Equation (1) is applied for each voxel v:

$$\text{Attenuation} = \frac{v}{1000}(\mu_{water} - \mu_{air}) + \mu_{water} \quad \text{Equation (1)}$$

where the linear attenuation coefficient of water $\mu_{water}$=0.0004 and the linear attenuation coefficient of air $\mu_{air}$=0.206. The results are clipped such that v≥0. Second, x-ray intensities are computed using Beer's law to generate a projected x-ray image. The intensities are reduced along the z dimension and then non-linearities are applied. Accordingly, the intensity at pixel $p_{xy}$ is as follows:

$$p_{xy} = 1 - \exp(\Sigma_i v_{xyi} \cdot d) \quad \text{Equation (2)}$$

where $v_{xyz}$ is the voxel at position xyz and d is the length of the voxel (in centimeters). Finally, the projected x-ray image is further processed to resemble image processing techniques applied in x-ray machines to generate the synthesized x-ray medical image. In one embodiment, the contrast of the projected image is reduced by applying gamma correction (with γ=2.5) and adaptive histogram equalization (with kernel size=128). Exemplary synthesized x-ray medical images are shown in FIG. 3, further described below.

To improve the computational efficiency of projecting the input CT medical image, some computations may be previously performed offline and the results saved to memory. In particular, the projection may be separated into linear and reduction operations. The first two steps in the projection (up to and including Equation (2)) are performed and the results of the reduction:

$$\hat{p}_{xy} = \Sigma_i v_{xyi}$$ Equation (3)

are saved to memory. The non-linear operations (e.g., in Equation 2 or the gamma correction or adaptive histogram equalization) in image space are relatively fast and can be computed online. Doing so has the advantage that the hyperparameters (e.g., $\gamma$) may be chosen randomly (e.g., for data augmentation).

It should be understood that the synthesized medical image may also be generated using any other suitable technique. For example, the synthesized medical image may be generated from the input medical image using a machine learning based network, such as, e.g., a generative adversarial network.

At step 106, a synthesized nodule image of each of the nodule regions and a synthesized remaining image of the remaining region are generated in the second modality. In one example, the synthesized nodule image is a synthesized image of nodule region 202 in FIG. 2A and the synthesized remaining image is a synthesized image of remaining region 206 with intensity values of pixels in nodule region 202 set to zero in FIG. 2A.

In one embodiment, the synthesized nodule images and the synthesized remaining image are generated by separately projecting the nodule regions and the remaining region in the input medical image to the second modality. In particular, for each nodule i, a separate projection of each nodule region of the input medical image is performed to generate synthesized nodule image $\hat{n}_{xy}^i$. In addition, a separate projection of the remaining region of the input medical image is performed to generate a synthesized remaining image $\hat{r}_{xy}^i$, where the intensity values of all pixels of nodules (i.e., all pixels in the nodule regions) are set to zero. The projections may be performed as described with respect to step 104. Accordingly, for a input medical image with k nodules, the following identity holds:

$$\hat{p}_{xy} = \hat{r}_{xy} + \Sigma_{i<k} \hat{n}_{xy}^i$$ Equation (4)

The synthesized nodule images $\hat{n}_{xy}^i$ and the synthesized remaining image $\hat{r}_{xy}^i$ may be saved to memory, allowing for the dynamic removal and addition of nodules for data augmentation.

In one embodiment, the synthesized nodule images $\hat{n}_{xy}^i$ and the synthesized remaining image $\hat{r}_{xy}^i$ are generated by extracting the synthesized nodule images $\hat{n}_{xy}^i$ and the synthesized remaining image $\hat{r}_{xy}^i$ from the synthesized medical image. The synthesized nodule images and the synthesized remaining image may also be generated using any other suitable technique (e.g., machine learning based network).

FIG. 3 shows exemplary synthesized images 300, in accordance with one or more embodiments. Images in column 302 show synthesized medical images $\hat{p}_{xy}$, images in column 304 show synthesized remaining images $\hat{r}_{xy}^i$, and images in column 306 show synthesized nodule images $\Sigma \hat{n}_{xy}^i$.

Referring back to FIG. 1, in one embodiment, the visibility of the nodules may be increased by highlighting the pixel intensity values of nodules which are close to the visibility threshold. Accordingly, a highlighting factor $h^i$ may be applied to the synthesized nodule images to increase the intensity of the pixels in the synthesized nodule images $\hat{n}_{xy}^i$, according to Equation (5):

$$\hat{p}_{xy} = \hat{r}_{xy} + \Sigma_{i<k} h^i \cdot \hat{n}_{xy}^i$$ Equation (5)

In one embodiment, the highlighting factor $h^i$ may be arbitrarily chosen. For example, a highlighting factor $h^i$ may be randomly selected between [1,2] to generate synthetic medical images with nodules of a variety of intensities.

FIG. 4 shows a comparison 400 of nodules highlighted with different highlighting factors, in accordance with one or more embodiments. Image 402 is a synthesized medical image $\hat{p}_{xy}$, image 404 is a synthesized remaining image $\hat{r}_{xy}^i$, image 406 is a synthesized nodule images $\Sigma \hat{n}_{xy}^i$, image 408 is a mask of dense anatomical structures that are not visible (as determined at step 108), image 410 is synthesized medical image 402 with a highlighting factor of 1, image 412 is synthesized medical image 402 with a highlighting factor of 2, image 414 is synthesized medical image 402 with a highlighting factor of 5, and image 416 is synthesized medical image 402 with a highlighting factor of 10.

At step 108 of FIG. 1, it is determined whether each particular nodule of the one or more nodules is visible in the synthesized medical image based on at least one of the synthesized nodule image for the particular nodule and the synthesized remaining image. Nodules visible in the input medical image (e.g., a 3D CT image) may be hidden in the synthesized medical image (e.g., x-ray image) after projection due to projecting the 3D image to 2D space. The synthesized medical image should not include annotations for nodules that are not visible in the synthesized medical image.

One reason that nodules may be hidden in the synthesized medical images is that the nodules are hidden behind a dense anatomical structure, such as, e.g., bones, hearth, liver, etc. In one embodiment, a nodule is considered to be hidden behind an anatomical structure in the synthesized medical image, and thus not visible, when the absolute intensity of the synthesized remaining image $\hat{r}_{xy}^i$ does not satisfy (e.g., does not exceeds) a certain threshold t (e.g., t=47). Formally, a nodule i with center coordinate (x, y) is considered to be not visible in the synthesized medical image if $\hat{r}_{xy}^i \le t$ and visible in the synthesized medical image if $\hat{r}_{xy}^i > t$.

Figure 5:
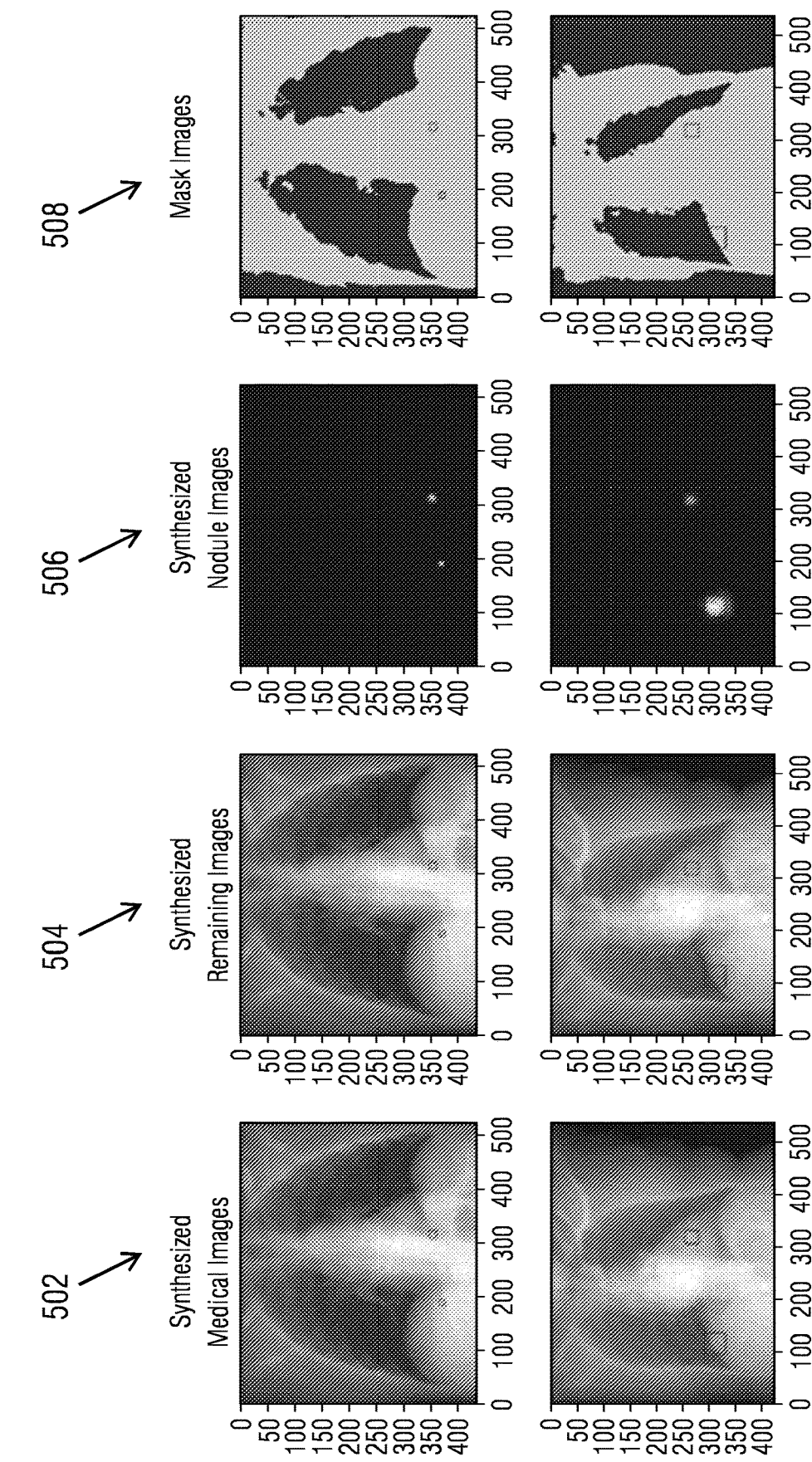
FIG. 5 shows exemplary images of hidden nodules hidden behind anatomical structures, in accordance with one or more embodiments.

FIG. 5 shows exemplary images 500 of hidden nodules hidden behind anatomical structures, in accordance with one or more embodiments. Images in column 502 show synthesized medical images $\hat{p}_{xy}$, images in column 504 show synthesized remaining images $\hat{r}_{xy}^i$, images in column 506 show synthesized nodule images $\Sigma \hat{n}_{xy}^i$, and images in column 508 show a mask of dense anatomical structures, where the light portions of the mask represent dense anatomical structure. As shown in the images in column 508, nodules are hidden behind anatomical structures (e.g., the hearth and the liver).

Another reason that nodules may be hidden in the synthesized medical image is that the relative intensity of the nodule tissue is low compared to the intensity of the tissue in surrounding area. In one embodiment, the nodule is considered visible if two conditions are met. First, a change between an intensity at the center of the nodules in the synthesized remaining image and an intensity at the center of the nodules in the synthesized nodule images increases by at least a certain threshold t (e.g., 15%). Formally, for a nodule i with center coordinate (x, y) with threshold t=15%, the equation $$\frac{\hat{r}_{xy}^i + \hat{n}_{xy}^i}{\hat{r}_{xy}^i} \ge 1.15.$$

Second, a change between an average intensity of pixels within half of the radius of the nodules in the synthesized remaining image and an average intensity of pixels within half of the radius of the nodules in the synthesized nodule image increases by at least a certain threshold t (e.g., 10%) amount.

Figure 6:
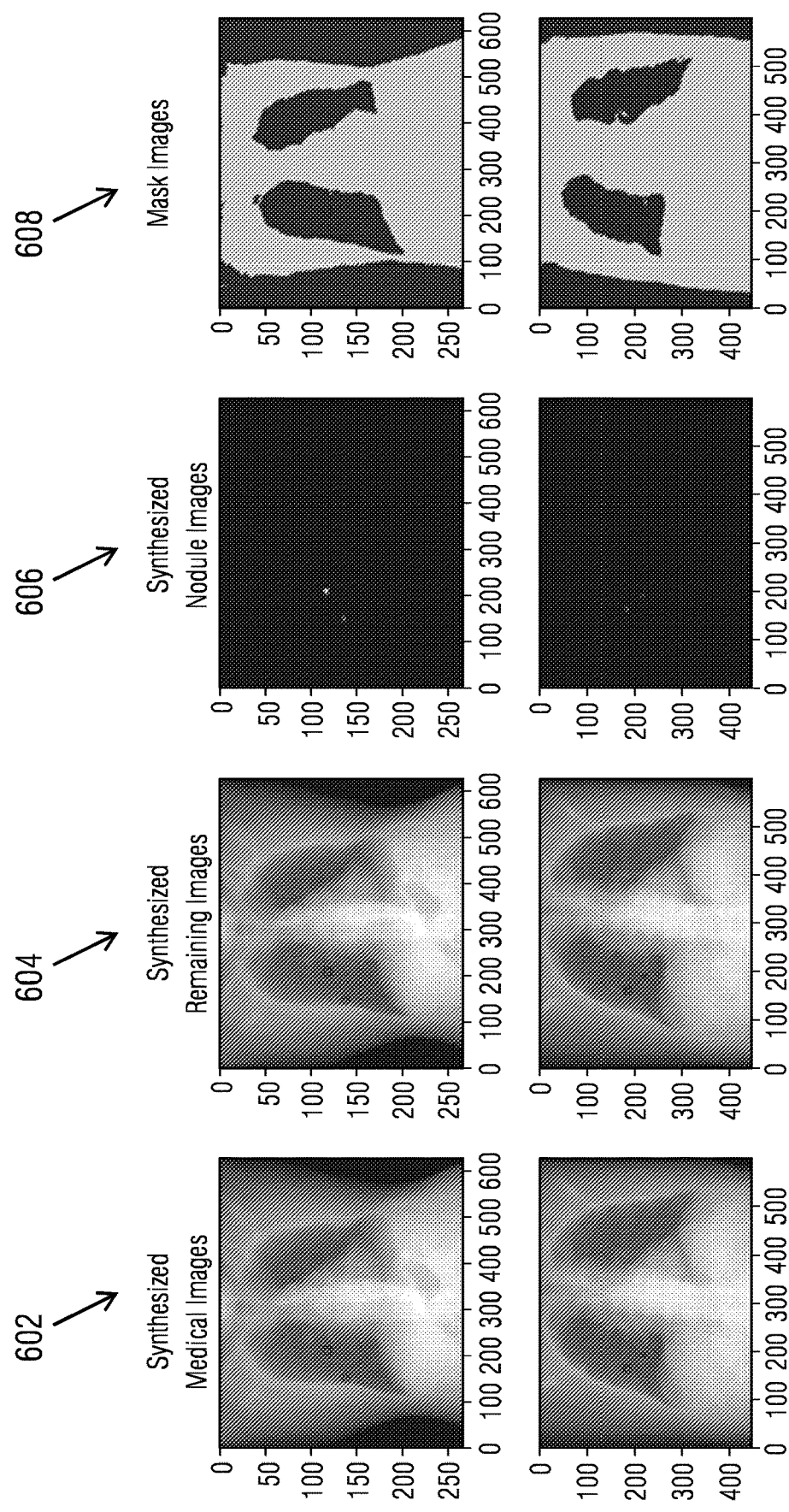
FIG. 6 shows exemplary images of hidden nodules hidden due to the relative intensity of the nodules, in accordance with one or more embodiments.

FIG. 6 shows exemplary images 600 of hidden nodules hidden due to the relative intensity of the nodules, in accordance with one or more embodiments. Images in column 602 show synthesized medical images $\hat{p}_{xy}$, images in column 604 show synthesized remaining images $\hat{r}_{xy}{}^i$, images in column 606 show synthesized nodule images $\Sigma \hat{n}_{xy}{}^i$, and images in column 608 show a mask of thresholded pixel intensity. As shown in the images in column 608, the nodules are hidden due to the low relative intensity of the nodules as compared to the tissue in the surrounding area.

At step 110 of FIG. 1, in response to determining that at least one nodule of the one or more nodules is not visible in the synthesized medical image, the annotation for the at least one not visible nodule is removed from the synthesized nodule image.

At step 112, the synthesized medical image is output. For example, the synthesized medical image can be output by displaying the synthesized medical image on a display device of a computer system, storing the synthesized medical image on a memory or storage of a computer system, or by transmitting the synthesized medical image to a remote computer system.

In one embodiment, synthesized medical images generated according to method 100 may be applied for training machine learning based networks for medical image analysis tasks, such as, e.g., nodule detection or nodule segmentation. For example, a nodule detector network implemented by a 2D Faster R-CNN (convolutional neural network) or a lung segmentation network implemented by a 2D U-Net may be respectively trained for nodule detection or lung segmentation in x-ray images using synthesized x-ray medical images generated according to method 100. In one embodiment, such networks are trained using only the synthesized x-ray medical images. However, in another embodiment, such networks are trained using a combination of synthesized x-ray medical images and real x-ray medical images. Advantageously, the synthesized x-ray medical images provides additional examples and examples of difficult to detect nodules in the training dataset, while having real x-ray medical images in the training dataset ensures that the feature extractors in the early layers of the networks are well adapted to the data distribution found in real x-ray medical images.

In one embodiment, various nodule augmentation techniques may be applied to generate the synthesized medical image in method 100.

In one embodiment, a nodule may be positioned in the synthesized medical image at step 104 by utilizing a database of previously acquired synthesized nodule images. A suitable position of the nodule may be determined based on visibility considerations described herein as well as a lung segmentation. Nodules with an intensity of less than, e.g., 0.5 (in linear space) may be removed from the database since there are no positions where they are visible.

In another embodiment, the input medical image received at step 102 may be rotated before generating the synthesized medical image at step 104. By rotating the input medical image, a variety of different viewpoint angles of the nodules are obtained, multiplying the amount of relevant features available per nodule. The rotations are performed during a prior offline stage, since they are operations in 3D space. To make this computationally feasible, a limited number (e.g., 20) of rotations per nodule are performed and the corresponding synthesized medical images are independently saved as separate images. During application of the synthesized medical images (e.g., during training of a machine learning based network), one of the images may be selected (e.g., randomly).

In another embodiment, after the synthesized medical image is generated at step 104, the nodules may be resized. In particular, a bi-cubic up-sampling or down-sampling of the synthesized medical image is applied. To account for the changes of tissue size in the z dimension, all synthesized medical images may be multiplied by a resize factor. This follows Beer's law since the ray has to travel through more tissue.

In another embodiment, the input medical image received at step 102 may be generated to include artificial or synthesized nodules as described in U.S. patent application Ser. No. 16/445,435, filed Jun. 19, 2019, and U.S. patent application Ser. No. 16/570,214, filed Sep. 13, 2019, the disclosures of which are incorporated herein by reference in their entirety. Synthesizing nodules in 3D space (e.g., of a CT image) is easier than in 2D space (e.g., an x-ray image).

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1. Certain steps or functions of the methods and workflows described herein, including one or more of the steps or functions of FIG. 1, may be performed by a server or by another processor in a network-based cloud-computing system. Certain steps or functions of the methods and workflows described herein, including one or more of the steps of FIG. 1, may be performed by a client computer in a network-based cloud computing system. The steps or functions of the methods and workflows described herein, including one or more of the steps of FIG. 1, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
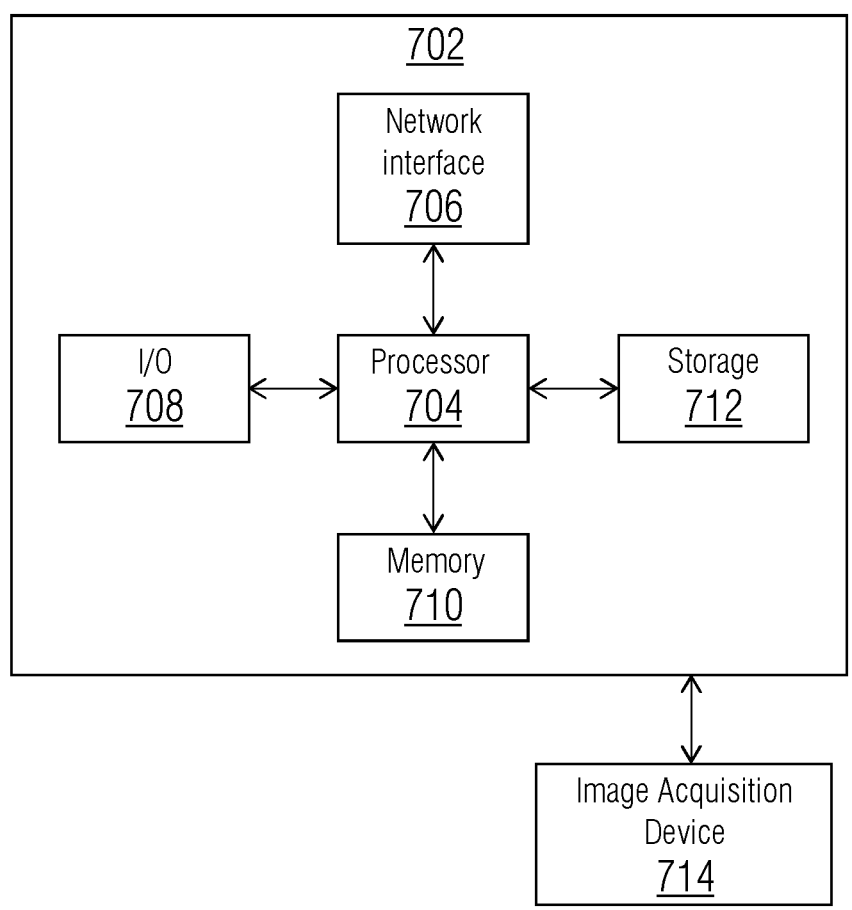
FIG. 7 shows a high-level block diagram of a computer.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIG. 1 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIG. 1. Accordingly, by executing the computer program instructions, the processor 704 executes the method and workflow steps or functions of FIG. 1. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD) monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method comprising:
receiving an input medical image in a first modality, the input medical image comprising a nodule region for each of one or more nodules and a remaining region, the input medical image comprising an annotation for each of the one or more nodules;
generating, from the input medical image, a synthesized medical image in a second modality, the synthesized medical image comprising the annotation for each of the one or more nodules;
generating, in the second modality, 1) a synthesized nodule image of each of the nodule regions and 2) a synthesized remaining image of the remaining region;
determining whether each particular nodule of the one or more nodules is visible in the synthesized medical image based on at least one of the synthesized nodule image for the particular nodule and the synthesized remaining image, wherein determining whether each particular nodule of the one or more nodules is visible in the synthesized medical image based on at least one of the synthesized nodule image for the particular nodule and the synthesized remaining image comprises:
  determining a change between an average intensity of pixels within half of a radius of the particular nodule in the synthesized remaining image and an average intensity of pixels within half of the radius of the particular nodule in the synthesized nodule image; and
  comparing the change to a threshold; and
in response to determining that at least one nodule of the one or more nodules is not visible in the synthesized medical image, removing the annotation for the at least one not visible nodule from the synthesized nodule image.

2. The method of claim 1, wherein generating, from the input medical image, a synthesized medical image in a second modality comprises:
  increasing an intensity of pixels in the synthesized nodule image by a highlighting factor.

3. The method of claim 1, wherein generating, from the input medical image, a synthesized medical image in a second modality further comprises:
  positioning a previously acquired synthesized nodule image in the synthesized medical image.

4. The method of claim 1, wherein generating, from the input medical image, a synthesized medical image in a second modality further comprises:
  rotating the input medical image; and
  generating the synthesized medical image from the rotated input medical image.

5. The method of claim 1, further comprising:
  training a machine learning based network based on the synthesized medical image.

6. The method of claim 1, wherein receiving an input medical image in a first modality comprises:
  generating the input medical image to include one or more synthesized nodules.

7. The method of claim 1, wherein the first modality is computed tomography and the second modality is x-ray.

8. An apparatus comprising:
  means for receiving an input medical image in a first modality, the input medical image comprising a nodule region for each of one or more nodules and a remaining region, the input medical image comprising an annotation for each of the one or more nodules;
  means for generating, from the input medical image, a synthesized medical image in a second modality, the synthesized medical image comprising the annotation for each of the one or more nodules;
  means for generating, in the second modality, 1) a synthesized nodule image of each of the nodule regions and 2) a synthesized remaining image of the remaining region;
  means for determining whether each particular nodule of the one or more nodules is visible in the synthesized medical image based on at least one of the synthesized nodule image for the particular nodule and the synthesized remaining image, wherein the means for determining whether each particular nodule of the one or more nodules is visible in the synthesized medical image based on at least one of the synthesized nodule image for the particular nodule and the synthesized remaining image comprises:
    means for determining a change between an average intensity of pixels within half of a radius of the particular nodule in the synthesized remaining image and an average intensity of pixels within half of the radius of the particular nodule in the synthesized nodule image; and
    means for comparing the change to a threshold; and
  means for in response to determining that at least one nodule of the one or more nodules is not visible in the synthesized medical image, removing the annotation for the at least one not visible nodule from the synthesized nodule image.

9. The apparatus of claim 8, wherein the means for generating, from the input medical image, a synthesized medical image in a second modality comprises:
  means for increasing an intensity of pixels in the synthesized nodule image by a highlighting factor.

10. A non-transitory computer readable medium storing computer program instructions, the computer program instructions when executed by a processor cause the processor to perform operations comprising:
  receiving an input medical image in a first modality, the input medical image comprising a nodule region for each of one or more nodules and a remaining region, the input medical image further comprising an annotation for each of the one or more nodules;
  generating, from the input medical image, a synthesized medical image in a second modality, the synthesized medical image comprising the annotation for each of the one or more nodules;
  generating, in the second modality, 1) a synthesized nodule image of each of the nodule regions and 2) a synthesized remaining image of the remaining region;
  determining whether each particular nodule of the one or more nodules is visible in the synthesized medical image based on at least one of the synthesized nodule image for the particular nodule and the synthesized remaining image, wherein determining whether each particular nodule of the one or more nodules is visible in the synthesized medical image based on at least one of the synthesized nodule image for the particular nodule and the synthesized remaining image comprises:
    determining a change between an average intensity of pixels within half of a radius of the particular nodule in the synthesized remaining image and an average intensity of pixels within half of the radius of the particular nodule in the synthesized nodule image; and
    comparing the change to a threshold; and
  in response to determining that at least one nodule of the one or more nodules is not visible in the synthesized medical image, removing the annotation for the at least one not visible nodule from the synthesized nodule image.

11. The non-transitory computer readable medium of claim 10, wherein generating, from the input medical image, a synthesized medical image in a second modality comprises:
  positioning a previously acquired synthesized nodule image in the synthesized medical image.

12. The non-transitory computer readable medium of claim 10, wherein generating, from the input medical image, a synthesized medical image in a second modality further comprises:
  rotating the input medical image; and
  generating the synthesized medical image from the rotated input medical image.

13. The non-transitory computer readable medium of claim 10, further comprising:

training a machine learning based network based on the synthesized medical image.

14. The non-transitory computer readable medium of claim 10, wherein the first modality is computed tomography and the second modality is x-ray.

* * * * *